(12) United States Patent
Matsuda et al.

(10) Patent No.: US 7,379,103 B1
(45) Date of Patent: May 27, 2008

(54) INTEGRATED FADING AND MIXING FOR A PICTURE PROCESSING APPARATUS

(75) Inventors: Hiromi Matsuda, Tokyo (JP); Eichiro Morinaga, Tokyo (JP); Miki Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/460,778

(22) Filed: Dec. 14, 1999

(30) Foreign Application Priority Data

Dec. 16, 1998 (JP) ................... 10-357471

(51) Int. Cl.
*H04N 5/262* (2006.01)
*H04N 9/74* (2006.01)

(52) U.S. Cl. ...................... 348/239; 348/584

(58) Field of Classification Search ........... 348/207.99, 348/222.1, 239, 584, 586–596; 345/629, 345/634–637; 382/294
See application file for complete search history.

(56) References Cited

U.S. PATENT DOCUMENTS

| | | | | |
|---|---|---|---|---|
| 5,220,433 A | * | 6/1993 | Mogamiya et al. ............ | 386/8 |
| 5,287,187 A | * | 2/1994 | Sato et al. .................. | 348/595 |
| 5,392,069 A | * | 2/1995 | Koyama et al. ............. | 348/239 |
| 5,416,529 A | * | 5/1995 | Lake .......................... | 348/590 |
| 5,473,371 A | * | 12/1995 | Choi ........................... | 348/239 |
| 5,600,370 A | * | 2/1997 | Furuyama ................... | 348/239 |
| 5,615,282 A | * | 3/1997 | Spiegel et al. .............. | 382/276 |
| 5,644,365 A | * | 7/1997 | Gehrmann ................... | 348/591 |
| 5,689,310 A | * | 11/1997 | Murase et al. .............. | 348/595 |
| 5,852,438 A | * | 12/1998 | Tomizawa et al. ........... | 348/595 |
| 6,359,657 B1 | * | 3/2002 | Westerink et al. .......... | 348/584 |
| 6,522,787 B1 | * | 2/2003 | Kumar et al. ............... | 382/268 |

* cited by examiner

*Primary Examiner*—Lin Ye
*Assistant Examiner*—Jason Whipkey
(74) *Attorney, Agent, or Firm*—Frommer Lawrence & Haug LLP; William S. Frommer; Thomas F. Presson

(57) ABSTRACT

The present invention provides a picture synthesizing apparatus comprising a first synthesis means for synthesizing base picture data with mix picture data to be synthesized with said base picture data; a single-color-picture generating means for generating a piece of single-color picture data or a plurality of pieces of single-color picture data; a select means for selecting one of said pieces of single-color picture data generated by said single-color-picture generating means to be used in fade processing of said base picture data and said mix picture data; and a second synthesis means for synthesizing an output of said first synthesis means with an output of said select means. Accordingly, the picture synthesizing apparatus of the present invention is capable of carrying out processing to synthesize a base picture and a mixing picture and fade processing in an integrated and coordinated manner as well as being capable of carrying out cross-fade processing in addition to single-color-fade processing.

10 Claims, 4 Drawing Sheets

| Control | | FADE Coeff. | TRANSPARENCY BITS | TRANSPARENCY Coeff. |
|---|---|---|---|---|
| 0 | 00 No Window | 0 | VALID TRANSPARENCY BITS | |
| | | | Y ALL 0: TRANSPARENT | 0 |
| | 01 Black FADE | Gain/64 | | |
| | 10 White FADE | Gain/64 | Y LSB 0: SEMI-TRANSPAREANT | 1/2 |
| | 11 Cross FADE | Gain/64 | Y LSB 1: OPAQUE | 1 |
| 1 | 00 No Window | 0 | INVALID TRANSPARENCY BITS | |
| | 01 Black FADE | Gain/64 | | |
| | 10 White FADE | Gain/64 | | |
| | 11 Cross FADE | Gain/64 | | |

Y: LUMINANCE DATA

FIG. 5

INTEGRATED FADING AND MIXING FOR A PICTURE PROCESSING APPARATUS

BACKGROUND OF THE INVENTION

The present invention relates to a picture synthesizing apparatus for carrying out a picture synthesis on base-picture data and mixing picture data at a transmittance ratio and for carrying out a fade processing based on the transmittance ratio and gain information in an integrated and coordinated manner. The present invention also relates to a picture processing apparatus for synthesizing an input picture and mixing picture data to produce a picture to be recorded and for synthesizing reproduced picture data and mixing picture data to produce an output picture by means of the picture synthesizing apparatus.

Figure 1:
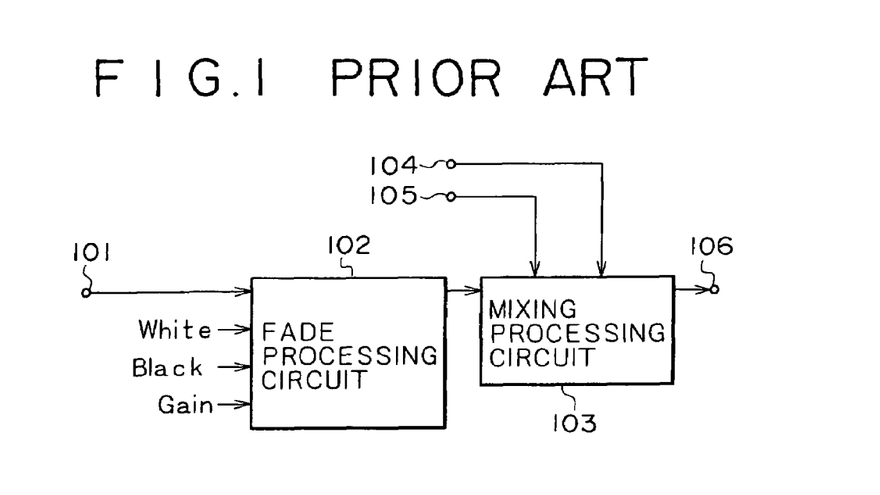
FIG. 1 is a block diagram used in an explanation of the related art fade processing and the related art mixing processing.

There has been becoming popular a digital camera which allows picture data to be recorded into recording media such as a semiconductor memory, a magnetic disc and an optical disc. In order to make such a digital camera capable of carrying out a fade-in process, a fade-out process and a process to synthesize a mixing picture, the related art digital camera is provided with a fade processing circuit 102 and a mixing processing circuit 103 as shown in FIG. 1. In such a configuration, the fade processing circuit 102 is used for carrying out fade-in and fade-out processes whereas the mixing processing circuit 103 is used for performing a synthesis process.

In the digital camera shown in FIG. 1, base picture data to undergo a fade processing is supplied to the fade processing circuit 102 by way of an input terminal 101. A white-color picture signal, a black-color picture signal and gain data are also supplied to the fade processing circuit 102.

The fade processing circuit 102 synthesizes the base picture data with the white-color picture signal or the black-color picture signal in accordance with the gain data in order to carry out fade-in and fade-out processes.

To put it in detail, a fade-in process is carried out by initially setting the gain for the white-color or black-color picture signal at a large value and the gain for the base picture data at a small value and then gradually decreasing the gain for the white-color or black-color picture signal while gradually increasing the gain for the base picture data. If the white-color picture signal is selected in the fade-in process, a picture will appear gradually from a white-color display. If the black-color picture signal is selected in the fade-in process, on the other hand, a picture will appear gradually from a black color display.

On the contrary, a fade-out process is carried out by initially setting the gain for the white-color or black-color picture signal at a small value and the gain for the base picture data at a large value and then gradually increasing the gain for the white-color or black-color picture signal while gradually decreasing the gain for the base picture data. If the white-color picture signal is selected in the fade-out process, a picture will disappear gradually, turning into a white-color display. If the black-color picture signal is selected in the fade-out process, on the other hand, a picture will disappear gradually, turning into a black color display.

A base picture output by the fade processing circuit 102 is supplied to the mixing processing circuit 103. The mixing processing circuit 103 superposes an OSD (On Screen Display) picture on the base picture. OSD data is supplied to the mixing processing circuit 103 by way of an input terminal 104 thereof. On the other hand, transmittance data is supplied to the mixing processing circuit 103 by way of an input terminal 105 thereof.

The mixing processing circuit 103 superposes the OSD (On Screen Display) data received through the input terminal 104 on the base picture received from the fade processing circuit 102. The transmittance indicates a priority given in a synthesis of the OSD picture on the base picture. To be more specific, an opaque transmittance indicates that the OSD picture is to be displayed on a portion where the base picture overlaps the OSD picture. A semi-transparent transmittance indicates that an intermediate value between the base picture and the OSD picture is to be displayed on a portion where the base picture overlaps the OSD picture. A transparent transmittance indicates that the base picture is to be displayed on a portion where the base picture overlaps the OSD picture. A result produced by the mixing processing circuit 103 appears at an output terminal 106 thereof.

Figure 2:
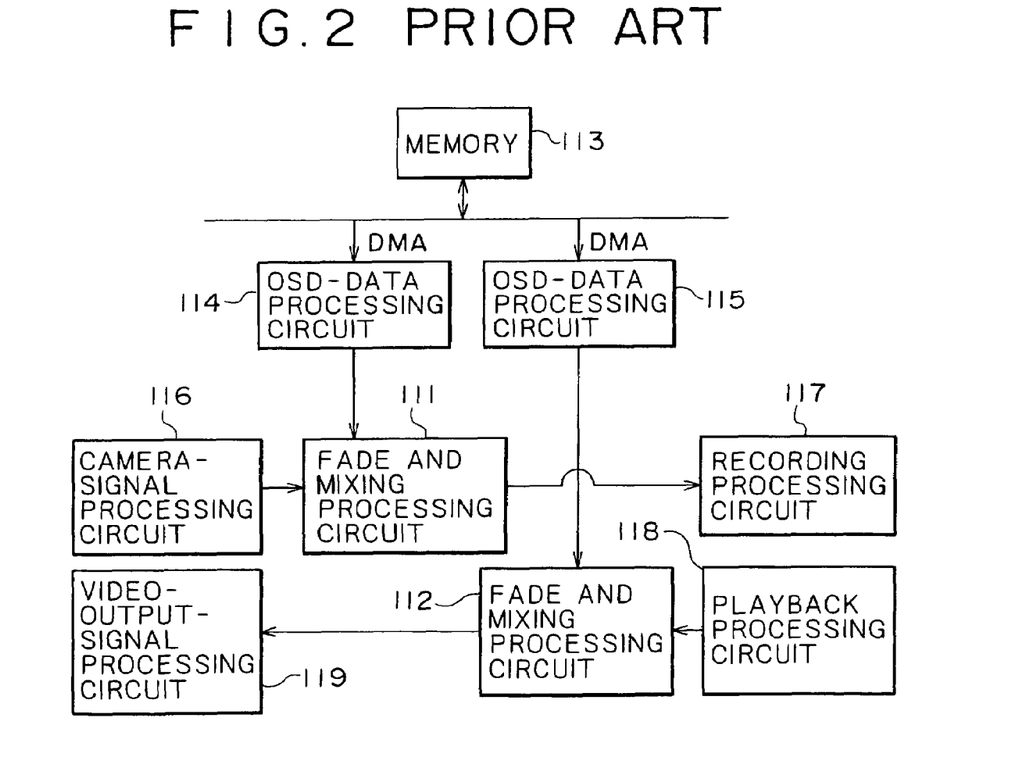
FIG. 2 is a block diagram showing a typical related art fade and mixing processing circuit.

Examples of the OSD picture are a design pattern and an animation character picture. In this case, a design pattern and/or an animation character picture is superposed on a base picture. In addition, a shrunk picture of an already picked-up picture used as an OSD picture makes a thumbnail showing a typical configuration of a picture display system of a digital camera employing a fade and mixing processing circuit implemented by the fade processing circuit 102 and the mixing processing circuit 103 described above. In FIG. 2, reference numerals 111 and 112 each denote a fade and mixing processing circuit. The fade and mixing processing circuits 111 and 112 each comprise the fade processing circuit 102 and the mixing processing circuit 103 as shown in FIG. 1. The fade and mixing processing circuit 111 carries out fade processing and mixing processing on a picture received from the camera. On the other hand, the fade and mixing processing circuit 112 carries out fade processing and mixing processing on a playback picture.

A memory 113 is used for storing a variety of mixing pictures such as a design pattern, an animation character picture and a shrunk picture of an already picked-up picture. Picture data to be superposed on a base picture in a camera-picture recording operation is read out from the memory 113 and set in an OSD-data processing circuit 114. On the other hand, picture data to be superposed on a base picture in a playback operation is read out from the memory 113 and set in an OSD-data processing circuit 115.

In an operation to record a camera picture signal, picture data generated by a camera-signal processing circuit 116 and picture data generated by the OSD-data processing circuit 114 to be superposed on the base picture are supplied to the fade and mixing processing circuit 111. The fade and mixing processing circuit 111 carries out fade-in as well as fade-out processes and superposes picture data received from the OSD-data processing circuit 114 on picture data received from the camera-signal processing circuit 116. Picture data output by the fade and mixing processing circuit 111 is supplied to a recording processing circuit 117 which records the picture data into recording media such as a semiconductor memory, a magnetic disc and an optical disc.

In an operation to play back picture data from the recording media, on the other hand, picture data generated by a playback processing circuit 118 and picture data generated by the OSD-data processing circuit 115 to be superposed on the base data upon playback of picture data recorded in advance are supplied to the fade and mixing processing circuit 112. The fade and mixing processing circuit 112 carries out fade-in as well as fade-out processes and superposes picture data received from the OSD-data processing circuit 115 on picture data received from the playback processing circuit 118. Picture data output by the fade and mixing processing circuit 112 is supplied to a video-output-signal processing circuit 119.

As described above, in order to make the related art digital camera capable of carrying out a fade-in process, a fade-out process and a process to synthesize a mixing picture, it is necessary to provide the digital camera with the fade processing circuit 102 and the mixing processing circuit 103 as shown in FIG. 1. In addition, in the configuration of the related art digital camera, the fade processing circuit 102 and the mixing processing circuit 103 are independent of each other.

In the configuration shown in FIG. 1, however, after the fade processing circuit 102 carries out a fade-in or fade-out process, the mixing processing circuit 103 synthesizes a mixing picture. For this reason, neither fade-in process nor fade-out process can be carried out on a mixing picture. In order to perform a fade-in or fade-out process on a mixing picture, it is necessary to provide another fade processing circuit at a stage behind the mixing processing circuit 103. Such another fade processing circuit will make the circuit configuration complicated.

In addition, in the configuration like the one shown in FIG. 1, the fade processing circuit 102 is designed to carry out only a black or white fade processing. With such a configuration, a cross fade processing can not be performed. In order to make the fade processing circuit 102 capable of carrying out a cross fade processing too, a processing circuit is further needed, making the circuit configuration complicated.

Furthermore, in the configuration of a related art picture display system of a digital camera like the one shown in FIG. 2, processing of a recording system is carried out in a manner completely independent of the processing of the playback system. Thus, the recording system is provided with the OSD-data processing circuit 114 and the mixing processing circuit 111 while the playback system is provided separately with the OSD-data processing circuit 115 and the mixing processing circuit 112. As a result, the circuit is large in size.

SUMMARY OF THE INVENTION

It is thus an object of the present invention to provide a picture synthesizing apparatus capable of carrying out processing to synthesize a base picture and a mixing picture and fade processing in an integrated and coordinated manner.

It is another object of the present invention to provide a picture synthesizing apparatus capable of carrying out cross-fade processing in addition to single-color-fade processing.

It is still another object of the present invention to provide a picture processing apparatus capable of carrying out fade processing and mixing processing of a recording system as well as fade processing and mixing processing of a playback system in an integrated and coordinated manner.

It is a further object of the present invention to provide a picture synthesizing apparatus comprising: a first synthesis means for synthesizing mixing picture data with base picture data; a select means for selecting the base picture data or single-color picture data; and a second synthesis means for synthesizing an output of the first synthesis means and an output of the select means.

It is a still further object of the present invention to provide a picture processing apparatus comprising: a first picture synthesizing means for synthesizing first mixing picture data with input data; a recording/playback means for recording data output by the first picture synthesizing means as data to be recorded and for reproducing the recorded data as playback data; and second picture synthesizing means for synthesizing the playback data with second mixing picture data to produce a display data, herein the first and second picture synthesizing means each comprise: first synthesis means for synthesizing mixing picture data with base picture data; a select means for selecting either the base picture data or single-color picture data; and a second synthesis means for synthesizing an output of the first synthesis means and an output of the select means.

Other objects, features and advantages of the invention will become more apparent by referring to the following description and appended drawings.

DESCRIPTION OF THE PREFERRED EMBODIMENTS

Figure 3:
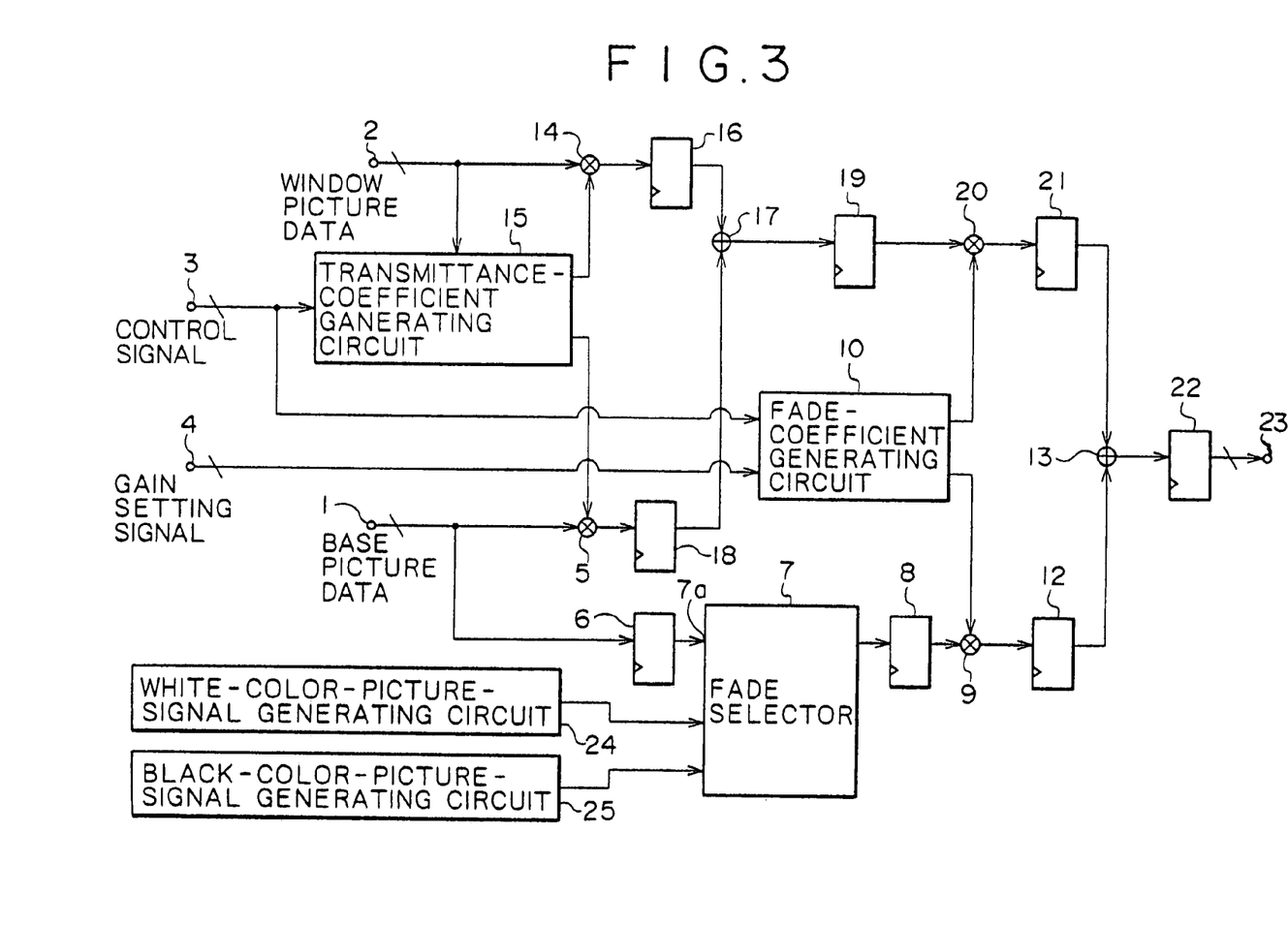
FIG. 3 is a block diagram showing a typical fade and mixing processing circuit to which the present invention is applied.

Some preferred embodiments of the present invention are described by referring to the accompanying diagrams as follows. FIG. 3 is a diagram showing the configuration of a mixing processing circuit to which the present invention is applied. The mixing processing circuit carries out mixing processing to synthesize a base picture and a mixing picture as well as fade-in processing and fade-out processing in an integrated and coordinated manner. In addition, the mixing processing circuit is capable of carrying out cross-fade processing, besides single-color fade processing such as white-fade processing and black-fade processing.

In the mixing processing circuit shown in FIG. 3, base picture data is supplied to a latch circuit 6 by way of an input terminal 1. The output of the latch circuit 6 is supplied to a terminal 7a of a fade selector 7. On the other hand, a white-color picture signal generated by a white-color-picture-signal generating circuit 24 and a black-color picture signal generated by a black-color-picture-signal generating circuit 25 are supplied to terminals 7b and 7c of the fade selector 7, respectively.

The output of the fade selector 7 is fed to a latch circuit 8 which supplies its output to a multiplier 9. The multiplier 9 also receives a fade coefficient from a fade-coefficient generating circuit 10. A product generated by the multiplier 9 is fed to a latch circuit 12 which supplies its output to an adder 13.

In the mean time, window picture data is supplied to a multiplier 14 by way of an input terminal 2. Window picture data is picture data to be superposed on a base picture for a display. A transmittance coefficient generated by a transmittance-coefficient generating circuit 15 is also supplied to the multiplier 14. A product generated by the multiplier 14 is fed to a latch circuit 16 which supplies its output to an adder 17.

In addition, the base picture data conveyed by way of the input terminal 1 is supplied also to the multiplier 5 which also receives a transmittance coefficient from the transmittance-coefficient generating circuit 15. A product output by the multiplier 5 is fed to a latch circuit 18 which supplies its output to an adder 17.

The adder 17 synthesizes a product of the base picture data and a transmittance coefficient received from the multiplier 5 with a product of the window picture data and a transmittance coefficient received from the multiplier 14. A sum output by the adder 17 is fed to a latch circuit 19 which supplies its output to a multiplier 20. A fade coefficient generated by a fade-coefficient generating circuit 10 is also supplied to the multiplier 20. A product output by the multiplier 20 is fed to a latch circuit 21 which supplies its output to an adder 13.

The adder 13 synthesizes picture data received from the multiplier 20 with picture data selected by the fade selector 7. As described above, the picture data received from the multiplier 20 is a result of a synthesis of the base picture and the window picture carried out by the adder 17. A sum output by the adder 13 is output to an output terminal 23 by way of a latch circuit 22.

A control signal is supplied to the transmittance-coefficient generating circuit 15 and the fade-coefficient generating circuit 10 by way of an input terminal 3. In accordance with the control signal input thereto, the transmittance-coefficient generating circuit 15 determines whether the degree of transmittance is transparent, semi-transparent or opaque, setting transmittance coefficients for the multipliers 14 and 5.

A gain setting signal is supplied to the fade-coefficient generating circuit 10 by way of an input terminal 4. The fade-coefficient generating circuit 10 sets gains for the multipliers 20 and 9.

In the mixing processing circuit provided by the present invention, the multipliers 5 and 14 and the adder 17 synthesize data of a base picture received through the input terminal 1 with data of a window picture received through the input terminal 2 as described above. At that time, the transmittance-coefficient generating circuit 15 determines whether the degree of transmittance is transparent, semi-transparent or opaque in accordance with the control signal received from the input terminal 3, setting transmittance coefficients for the multipliers 14 and 5.

If the degree of transmittance is determined to be transparent, the gain of the multiplier 14 is set at 0 and the gain of the multiplier 5 is set at 1. In this case, the priority level of the base picture is higher than that of the window picture. With such gains, the base picture appears on a portion where the base picture overlaps the window picture.

If the degree of transmittance is determined to be semi-transparent, the gain of the multiplier 14 is set at ½ and the gain of the multiplier 5 is set also at ½. With such gains, an intermediate value between the base picture and the window picture appears on a portion where the base picture overlaps the window picture.

If the degree of transmittance is determined to be opaque, the gain of the multiplier 14 is set at 1 and the gain of the multiplier 5 is set at 0. In this case, the priority level of the base picture is lower than that of the window picture. Thus, the window picture appears on a portion where the base picture overlaps the window picture.

The multipliers 20 and 9 and the adder 13 carry out synthesis processing and fade processing on synthesis picture data and picture data selected by the fade selector 7. The synthesis picture data is obtained as a result of a synthesis of the base picture and the window picture carried out by the adder 17. In the processing, the fade selector 7 receives the base picture, a white-color picture and a black-color picture, allowing to select a white fade, a black fade or a cross fade.

In the case of a white fade, the fade selector 7 selects the white-color picture received through the terminal 7b. With the white-color picture selected by the fade selector 7, if the gain of the multiplier 9 is gradually decreased while the gain of the multiplier 20 is gradually increased, a display obtained as a result of a synthesis of a base picture and a window picture gradually appears from a white single-color display. If the gain of the multiplier 9 is gradually increased while the gain of the multiplier 20 is gradually decreased, on the other hand, a display obtained as a result of a synthesis of a base picture and a window picture gradually changes to the white single-color display.

In the case of a black fade, the fade selector 7 selects the black-color picture received through the terminal 7c. With the black-color picture selected by the fade selector 7, if the gain of the multiplier 9 is gradually decreased while the gain of the multiplier 20 is gradually increased, a display obtained as a result of a synthesis of a base picture and a window picture gradually appears from a black single-color display. If the gain of the multiplier 9 is gradually increased while the gain of the multiplier 20 is gradually decreased, on the other hand, a display obtained as a result of a synthesis of a base picture and a window picture gradually changes to the black single-color display.

In the case of a cross fade, the fade selector 7 selects the base picture received through the terminal 7a. With the base picture selected by the fade selector 7, if the gain of the multiplier 9 is gradually decreased while the gain of the multiplier 20 is gradually increased, a display obtained as a result of a synthesis of a base picture and a window picture gradually appears from a display of the base picture. If the gain of the multiplier 9 is gradually increased while the gain of the multiplier 20 is gradually decreased, on the other hand, a display obtained as a result of a synthesis of a base picture and a window picture gradually changes to the display of the base picture. Finally, as the gain of the multiplier 9 is set at 1 while the gain of the multiplier 20 is set at 0, only the base picture is displayed without the window picture.

As described above, the mixing processing circuit is capable of carrying out mixing processing to synthesize a base picture and a mixing picture as well as fade-in processing and fade-out processing in an integrated and coordinated manner. The control signal and the gain setting signal received through the input terminals 3 and 4, respectively are used to determine the degree of transmittance used in the processing to synthesize the base picture with the mixing picture and to set a white, black or cross fade as a fade type.

Figure 4:
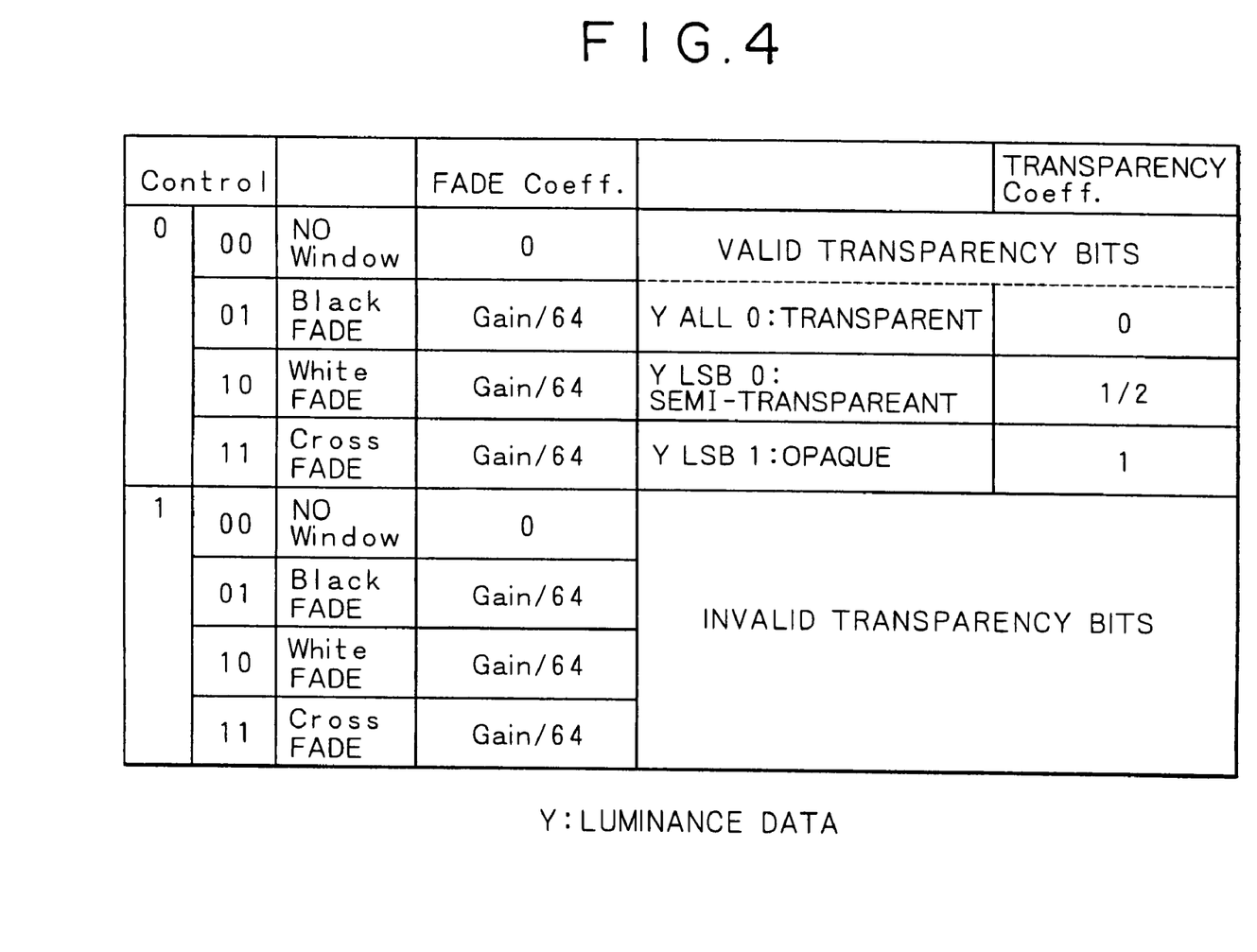
FIG. 4 shows a table used in an explanation of a typical mixing processing circuit to which the present invention is applied.

As shown in FIG. 4, the control signal received through the input terminal 3 is a 3-bit signal. Typically, the most significant bit of the control signal is a transparency validity flag indicating whether the determination of the degree of transmittance is valid or invalid. To be more specific, a control signal with the most significant bit thereof set at 1 indicates that transparency bits are invalid. In this case, the degree of transparency is always determined to be opaque and the gain of the multiplier 14 is set at 1 while the gain of the multiplier 5 is set at 0.

It should be noted that luminance data Y included in the window picture data is supplied to the transmittance-coefficient generating circuit 15 from the input terminal 2. The luminance data Y has a length of 8 bits.

On the other hand, a control signal with the most significant bit thereof set at 0 indicates that transparency bits are valid. In this case, the luminance data Y is used to determine whether the degree of transmittance is transparent, semi-transparent or opaque.

To put it in detail, the luminance data Y is checked to find out whether or not all bits thereof are 0. Luminance data Y with all bits thereof set at 0 indicates that the degree of transmittance is transparent. In this case, the gain of the multiplier 14 is set at 0 while the gain of the multiplier 5 is set at 1.

If the least significant bit of the luminance data Y is 0 and at least one of the remaining bits is 0, the degree of transmittance is determined to be semi-transparent. In this case, both the gain of the multiplier 14 and the gain of the multiplier 5 are set at ½.

If the least significant bit of the luminance data Y is 1, the degree of transmittance is determined to be opaque. In this case, the gain of the multiplier 14 is set at 1 while the gain of the multiplier 5 is set at 0.

The two least significant bits of the control signal indicate whether the fade type is black, white or cross fade. If the 2 least significant bits of the control signal are 00, the gain of the multiplier 20 is set at 0 to result in a display with the window picture removed.

If the two least significant bits of the control signal are 01, the black fade is set as a fade type. In this case, the fade selector 7 is driven to select a black-color picture signal received through the terminal 7c so that the selected signal is output thereby. Then, the fade-coefficient generating circuit 10 is operated to output coefficients at 64 stages. In this way, black-fade processing is carried out.

If the 2 least significant bits of the control signal are 10, the white fade is set as a fade type. In this case, the fade selector 7 is driven to select a white-color picture signal received through the terminal 7b so that the selected signal is output thereby. Then, the fade-coefficient generating circuit 10 is operated to output coefficients at 64 stages. In this way, white-fade processing is carried out.

If the 2 least significant bits of the control signal are 11, the cross fade is set as a fade type. In this case, the fade selector 7 is driven to select a base-picture signal received through the terminal 7a so that the selected signal is output thereby. Then, the fade-coefficient generating circuit 10 is operated to output coefficients at 64 stages. In this way, cross-fade processing is carried out.

As described above, the mixing processing circuit shown in FIG. 3 is capable of carrying out mixing processing to synthesize a base picture and a mixing picture as well as fade-in processing and fade-out processing in an integrated and coordinated manner. In addition, the mixing processing circuit is capable of carrying out cross-fade processing, besides single-color fade processing such as white-fade processing and black-fade processing.

In the embodiment described above, white-fade or black-fade processing is carried out as single-color-fade processing. It should be noted, however, that fade processing of other colors can also be performed. An example of the fade processing of other colors is blue-fade processing.

Figure 5:
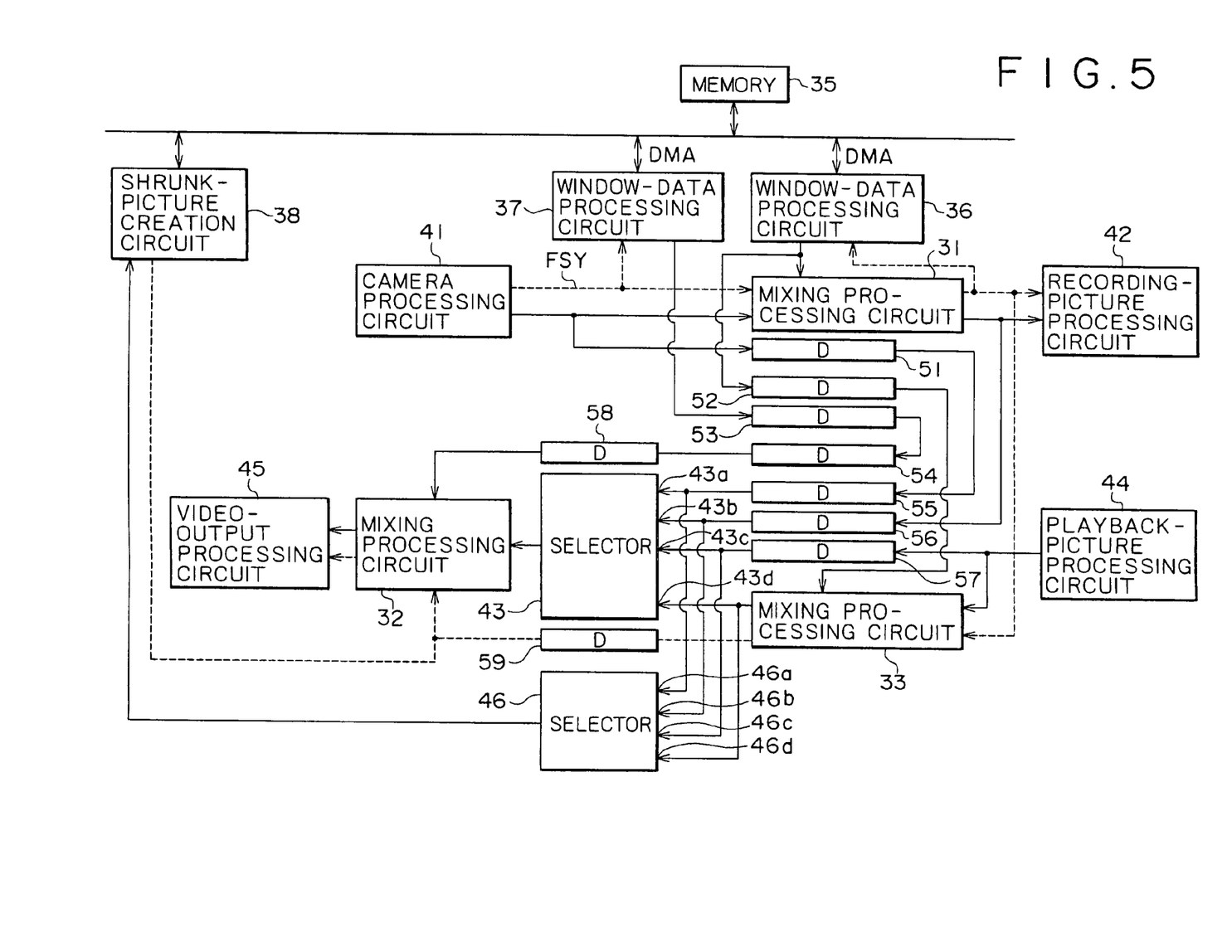
FIG. 5 is a block diagram showing a typical picture processing system to which the present invention is applied.

FIG. 5 is a diagram showing the configuration of a system for carrying out fade processing and mixing processing of a window picture produced by a digital camera by means of the mixing processing circuit described above.

In FIG. 5, reference numerals 31, 32 and 33 each denote a mixing processing circuit. Each of the mixing processing circuits 31, 32 and 33 has the configuration shown in FIG. 3. The mixing processing circuit 31 carries out processing to mix window picture data with base picture data to be recorded and fade processing on the mixed data. By mixing window picture data with base picture data to be recorded, a design pattern, an animation character picture and the like or a shrunk picture of an already picked-up picture can be synthesized with the base picture to be recorded.

The mixing processing circuit 32 carries out processing to mix window picture data with a display picture to be output and fade processing on the mixed data. It is necessary to display information such as operation setting conditions and a warning text on the display picture to be output. By operating the mixing processing circuit 32 to carry out processing of mixing window picture data with base picture data to be recorded, it is possible to display graphics such as operation setting conditions and a warning text.

The mixing processing circuit 33 carries out processing to mix window picture data with base picture data to be reproduced and fade processing on the mixed data. By mixing window picture data with base picture data to be reproduced, a design pattern, an animation character picture and the like or a shrunk picture of an already picked-up picture can be synthesized with the base picture to be reproduced.

Shrunk picture data to be synthesized with a picture to be recorded, a playback picture or a display picture is stored in a memory 35 which is provided with window-data processing circuits 36 and 37 and a shrunk-picture creation processing circuit 38. The memory 35, the window-data processing circuits 36 and 37 and the shrunk-picture creation processing circuit 38 are controlled by using a DMA (Direct Memory Access) technique.

The window-data processing circuit 36 forms a window picture to be synthesized with a camera picture or a playback picture. That is to say, the window-data processing circuit 36 reads out a design pattern, an animation character picture or a shrunk picture of an already picked-up picture from the memory 35 as a window picture to be synthesized with a camera picture or a playback picture and sets the window picture in the mixing processing circuit 31 and 33.

The window-data processing circuit 37 forms a window picture to be synthesized with a display picture. That is to say, the window-data processing circuit 37 reads out a picture such as a text describing an operation setting condition or a warning from the memory 35 as a window picture to be synthesized with a display picture and sets the window picture in the mixing processing circuit 32.

The shrunk-picture creation processing circuit 38 forms shrunk picture data from a camera or playback picture and stores the data into the memory 35. A shrunk picture is utilized in an operation such as a thumbnail display.

A selector 43 selects one of its input terminals 43a, 43b, 43c and 43d as a source of a display picture to be output. The output of a camera processing circuit 41 is supplied to the input terminal 43a of the selector 43 by way of delay circuits 51 and 55. The output of the mixing processing circuit 31 is supplied to the input terminal 43b of the selector 43 by way of a delay circuit 56. The output of a playback-picture processing circuit 44 is supplied to the input terminal 43c of the selector 43 by way of a delay circuit 57. The output of the mixing processing circuit 33 is supplied to the input terminal 43d of the selector 43.

In an attempt to monitor a picture being picked up through a camera, the input terminal 43a of the selector 43 is selected. In an attempt to monitor a picture being recorded, the input terminal 43b of the selector 43 is selected. In order to display a playback picture, the input terminal 43c of the selector 43 is selected. In order to display a picture obtained as a result of a process to mix a window picture with a playback picture, the input terminal 43d of the selector 43 is selected.

A selector 46 selects one of its input terminals 46a, 46b, 46c and 46d as a source of a shrunk picture. The output of the camera processing circuit 41 is supplied to the input terminal 46a of the selector 46 by way of delay circuits 51 and 55. The output of the mixing processing circuit 31 is supplied to the input terminal 46b of the selector 46 by way of a delay circuit 56. The output of a playback-picture processing circuit 44 is supplied to the input terminal 46c of the selector 46 by way of a delay circuit 57. The output of the mixing processing circuit 33 is supplied to the input terminal 46d of the selector 46.

In order to form a shrunk picture of a picture being picked up through a camera, the input terminal 46a of the selector 46 is selected. In order to form a shrunk picture of a picture being recorded, the input terminal 46b of the selector 46 is selected. In order to form a shrunk picture of a picture being played back, the input terminal 46c of the selector 46 is selected. In order to form a shrunk picture of a picture obtained as a result of a process to mix a window picture with a playback picture, the input terminal 46d of the selector 46 is selected.

Delay circuits 51 to 59 are provided for establishing synchronization among pieces of picture data. In this system, the synchronization is based on a frame sync FSY generated by the camera processing circuit 41. The delay circuits 51, 52 and 53 produce a delay corresponding to the mixing processing circuit 31. The delay circuits 54, 55, 56 and 57 produce a delay corresponding to the mixing processing circuit 32. The delay circuits 58 and 59 produce a delay corresponding to the selector 43.

In an operation to record a camera picture, the camera processing circuit 41 supplies base picture data to the mixing processing circuit 31. The output of the camera processing circuit 41 is supplied also to the terminal 43a of the selector 43 by way of the delay circuits 51 and 55. The window-data processing circuit 36 supplies window picture data to the mixing processing circuit 31. The mixing processing circuit 31 carries out processing to mix the base picture data generated by the camera processing circuit 41 with the window picture data generated by the window-data processing circuit 36 and fade processing on the mixed data. In such processing, a design pattern, an animation character picture and a shrunk picture of an already picked up picture is mixed with a base picture to be recorded. In addition, white-fade, black-fade or cross-fade processing is carried out on the base picture to be recorded.

The output of the mixing processing circuit 31 is supplied to a recording-picture processing circuit 42 which records the picture data into recording media such as a semiconductor memory, a magnetic disc and an optical disc.

The output of the mixing processing circuit 31 is supplied also to the terminal 43b of the selector 43 and the terminal 46b of the selector 46 by way of the delay circuit 56.

When it is desired to monitor a camera picture in a recording operation, the selector 43 is set at the terminal 43a. With the selector 43 set at the terminal 43a, the output of the camera processing circuit 41 is supplied to the mixing processing circuit 32 by way of the delay circuit 51, the delay circuit 55 and the selector 43.

When it is desired to monitor a picture being recorded in a recording operation, the selector 43 is set at the terminal 43b. With the selector 43 set at the terminal 43b, the output of the mixing processing circuit 31 is supplied to the mixing processing circuit 32 by way of the delay circuit 56 and the selector 43.

The window-data processing circuit 37 supplies window processing data to the mixing processing circuit 32 by way of the delay circuits 53, 54 and 58. The mixing processing circuit 32 synthesizes a picture such as a text describing a warning or operation setting conditions with a monitoring picture. The output of the mixing processing circuit 32 is supplied to the video-output processing circuit 45.

In an operation to play back a picture, base picture data is reproduced from the playback-picture processing circuit 44 and supplied to the mixing processing circuit 33. The mixing processing circuit 33 also receives window picture data generated by the window-data processing circuit 36 by way of the delay circuit 52. The mixing processing circuit 33 carries out processing to mix the window picture data received from the window-data processing circuit 36 with the base picture data received from the playback-picture processing circuit 44 and fade processing on the mixed picture data to synthesize a design pattern, an animation character picture and a shrunk picture of an already picked-up picture with the base picture to be reproduced. In addition, white-fade, black-fade or cross-fade processing is carried out on the base picture to be reproduced.

The output of the mixing processing circuit 33 is supplied to the terminal 43d of the selector 43. In addition, the output of the mixing processing circuit 33 is also supplied to the terminal 46d of the selector 46.

When it is desired to monitor a playback picture in a playback operation, the selector 43 is set at the terminal 43c. With the selector 43 set at the terminal 43c, the output of the playback-picture processing circuit 44 is supplied to the mixing processing circuit 32 by way of the delay circuit 57 and the selector 43. When it is desired to display a picture obtained as a result of a synthesis of a window picture with a playback picture in a playback operation, the selector 43 is set at the terminal 43d. With the selector 43 set at the terminal 43d, the output of the mixing processing circuit 33 is supplied to the mixing processing circuit 32 by way of the selector 43.

The window-data processing circuit 37 supplies window picture data to the mixing processing circuit 32 by way of delay circuits 53, 54 and 58. The mixing processing circuit 32 synthesizes a picture such as a text describing a warning or operation setting conditions with the playback picture. In addition, the mixing processing circuit 32 is also capable of carrying out fade processing on an output picture as a whole. The output of the mixing processing circuit 32 is supplied to a video-output processing circuit 45.

As described above, a system for carrying out mixing processing and fade processing on a window picture of a digital camera has a configuration employing the mixing processing circuits 31, 32 and 33 which are capable of performing the mixing processing and the fade processing in an integrated and coordinated manner. To put it in detail, mixing processing and fade processing on a signal of a picture picked up by camera as well as mixing processing and fade processing on a playback signal can be carried out in an integrated and coordinated manner. In addition, mixing processing and fade processing can be carried out on a display picture in an integrated and coordinated manner. Furthermore, window picture data for a signal of a picture picked up by camera and window picture data for a playback signal are processed in the common window-data processing circuit 36. The size of the circuit can thus be reduced.

As described above, the embodiment employs mixing processing circuits, namely, all the three mixing processing circuits 31, 32 and 33, which are capable of carrying out mixing processing and fade processing shown in FIG. 3 in an integrated and coordinated manner. It should be noted, however, that mixing processing and fade processing on a signal of a picture picked up by a camera as well as mixing processing and fade processing of a playback signal can also be carried out in an integrated and coordinated manner by using a mixing processing circuit which is provided independently of a mixing processing circuit for performing mixing processing and fade processing on a display signal in an integrated and coordinated manner.

According to the present invention, the multipliers 14 and 5 and the adder 17 synthesize base picture data with mix picture data. A priority order is set in accordance with information on transmittance and a window picture is superposed on base picture data to produce a synthesized mix picture. Furthermore, the multipliers 20 and 9 and the adder 13 synthesize synthesized picture data, which is obtained as a result of a synthesis of the base picture data and window data, with the base picture data or single-color picture data. The synthesized picture data, which is obtained as a result of a synthesis of the base picture data and window data, is synthesized with the base picture data or single-color picture data at a various mixture ratio determined from information related to the mixture ratio. Different types of fade processing can be carried out by changing the mixture-ratio information. The fade selector 37 is used to select either single-color fade processing or cross-fade processing.

In addition, according to the present invention, there are provided the mixing processing circuit 31 for carrying out synthesis and fade processing on picture data to be recorded and mix picture data, and the mixing processing circuit 33 for carrying out synthesis and fade processing on reproduced picture data and mix picture data. The mixing processing circuits 31 and 33 are capable of carrying out synthesis and fade processing on base picture data and mix picture data in an integrated and coordinated manner. In addition, since the mixing processing circuits 31 and 33 share the common window-data processing circuit 36, the circuit configuration can be made simple.

It should be noted that a window picture is not limited to merely a picture with a frame shape such as a window frame. In general, a window picture is defined as mix picture data to be synthesized with a base picture.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A picture synthesizing apparatus comprising:
a first synthesis means for synthesizing base picture data with picture data to produce synthesized data, said first synthesis means including a transparency control circuit configured to control the transparency of said picture data with respect to said base picture data based on luminance of said picture data, and to generate mix picture data, said first synthesis means including a fade controller to receive and use a fade coefficient to control fade processing of said synthesized data in accordance with said fade coefficient,
wherein a first control signal is received by said transparency control circuit and is used to determine the degree of transmittance used in synthesizing base picture data with the mix picture data,
wherein said first control signal and a gain setting signal are received by a fade coefficient generating circuit and are used to set a single-color fade or cross fade as a fade type in said fade processing; and
wherein said first control signal includes a transparency validity flag indicating whether the determination of the degree of transmittance is valid,
wherein, when the degree of transmittance is determined to be invalid, a degree of transparency is determined to be opaque, and
wherein when the degree of transmittance is determined to be valid, the degree of transparency is determined to be transparent, semi-transparent, or opaque as a function of luminance data in the first control signal;
a single-color-picture generating means for generating a piece of single-color picture data or a plurality of pieces of single-color picture data;
a select means for selecting said base picture data or said piece of single-color picture data or one of said plurality of pieces of single-color picture data generated by said single-color-picture generating means, said select means operating to use said selected base picture data or single-color picture data in fade processing of said base picture data and said mix picture data; and
a second synthesis means for synthesizing an output of said first synthesis means with an output of said select means.

2. A picture synthesizing apparatus according to claim 1, wherein
said transparency control circuit generates a coefficient representing a transmittance ratio of said mix picture data to said base picture data; and
a superposition means for superposing said mix picture data on said base picture data in accordance with said transmittance ratio generated by said transparency control circuit.

3. A picture synthesizing apparatus according to claim 2, wherein said transparency control circuit generates a coefficient representing a transmittance ratio on the basis of transmittance information and luminance data.

4. A picture synthesizing apparatus according to claim 3, wherein said transparency control circuit displays a picture with a base picture taking precedence of a mix picture by setting a gain of said base picture data in said first synthesis means at a maximum while setting a gain of said mix picture data in said first synthesis means at a minimum, if transmittance data included in said transmittance information is valid and luminance data indicates transparency.

5. A picture synthesizing apparatus according to claim 3, wherein said transparency control circuit sets gains of said base picture data and said mix picture data in said first synthesis means at values allowing said base picture data to be mixed with said mix picture data, if transmittance data included in said transmittance information is valid and luminance data indicates semi-transparency.

6. A picture synthesizing apparatus according to claim 3, wherein said transparency control circuit displays a picture with a mix picture taking precedence of a base picture by setting a gain of said base picture data in said first synthesis means at a minimum while setting a gain of said mix picture data in said first synthesis means at a maximum, if transmittance data included in said transmittance information is valid and luminance data indicates opaqueness.

7. A picture synthesizing apparatus according to claim 1, wherein said select means selects a piece or a plurality of pieces of single-color data and base picture data.

8. A picture processing apparatus comprising:

a first picture synthesizing means for synthesizing input data with first picture data to be synthesized with said input data and for carrying out fade processing to produce data to be recorded;

a recording/playback means for recording said data to be recorded onto recording media and for playing back said recorded data as playback data; and a second picture synthesizing means for synthesizing playback data played back by said recording/playback means with second mix picture data to be synthesized with said playback data and for carrying out fade processing to produce data to be displayed, wherein said first picture synthesizing means includes:

a first synthesis means for synthesizing base picture data with said first picture data to produce synthesized data, said first synthesis means including a transparency control circuit configured to control the transparency of said first picture data with respect to said base picture data based on luminance data of said first picture data, and to generate first mix picture data, said first synthesis means including a fade controller to receive and use a fade coefficient to control fade processing of said synthesized data in accordance with said fade coefficient, wherein a first control signal is received by said transparency control circuit and is used to determine the degree of transmittance used in synthesizing base picture data with the mix picture data, and wherein said first control signal and a gain setting signal are received by a fade coefficient generating circuit and are used to set a single-color fade or cross fade as a fade type in said fade processing; and wherein said first control signal includes a transparency validity flag indicating whether the determination of the degree of transmittance is valid, wherein, when the degree of transmittance is determined to be invalid, a degree of transparency is determined to be opaque, and wherein when the degree of transmittance is determined to be valid, the degree of transparency is determined to be transparent, semi-transparent, or opaque as a function of luminance data in the first control signal;

a select means for selecting said base picture data or single-color picture data for fade processing of said base picture data and said first mix picture data; and a second synthesis means for synthesizing an output of said first synthesis means with an output of said select means; and wherein said second picture synthesizing means includes:

a first synthesis means for synthesizing base picture data with said second mix picture data;

a select means for selecting said base picture data or single-color picture data for fade processing of said base picture data and said second mix picture data; and a second synthesis means for synthesizing an output of said first synthesis means with an output of said select means.

9. A picture processing apparatus according to claim 8, said apparatus further comprising a window-data processing means for generating mix picture data and for supplying both said first mix picture data and said second mix picture data.

10. A picture processing apparatus according to claim 8, further comprising:

a third synthesis means used for synthesizing said data to be displayed with third mix picture data, including:

a first synthesizing means for synthesizing base picture data with said third mix picture data;

a select means for selecting either said base picture data or single-color picture data; and a second synthesizing means for synthesizing an output of said first synthesis means with an output of said select means.

* * * * *